United States Patent [19]

Jones et al.

[11] Patent Number: 4,986,296
[45] Date of Patent: Jan. 22, 1991

[54] METHOD AND APPARATUS FOR CHLORINATING WATER WITH LIQUEFIED CHLORINE

[75] Inventors: Walton B. Jones, Richboro; Richard C. Elterich, Bethlehem, both of Pa.

[73] Assignee: Capital Controls Company, Inc., Colmar, Pa.

[21] Appl. No.: 497,181

[22] Filed: Mar. 22, 1990

[51] Int. Cl.⁵ .............................. F17C 7/02
[52] U.S. Cl. ......................... 137/3; 137/209; 137/334; 137/602; 62/50.1
[58] Field of Search ............ 137/2, 3, 5, 88, 93, 137/209, 602, 334; 62/50.1

[56] References Cited

U.S. PATENT DOCUMENTS

| | | |
|---|---|---|
| 1,962,571 | 6/1934 | Ornstein . |
| 2,678,541 | 5/1954 | Sheen . |
| 3,133,877 | 5/1964 | Mixer et al. . |
| 3,365,898 | 1/1960 | Van Kleef .................. 62/50.1 |
| 3,380,462 | 4/1968 | Schieber et al. . |
| 3,975,284 | 8/1976 | Lambert . |
| 4,534,952 | 8/1985 | Rapson et al. . |
| 4,770,198 | 9/1988 | Bergman . |

Primary Examiner—Alan Cohan
Attorney, Agent, or Firm—Howson and Howson

[57] ABSTRACT

A liquefied gas, such as liquefied chlorine, which is injected into a liquid stream such as an aqueous stream, in the liquid state, is prevented from causing the liquid stream to freeze by cooling the liquefied gas to a temperature below its boiling point at the pressure of the liquid stream.

21 Claims, 2 Drawing Sheets

METHOD AND APPARATUS FOR CHLORINATING WATER WITH LIQUEFIED CHLORINE

FIELD OF THE INVENTION

This invention relates to a method and apparatus for introducing liquefied gases into liquid streams and more particularly to a method and apparatus for introducing a liquefied halogen such as chlorine into an aqueous stream. The invention can be applied to the introduction of any liquefied gas into any liquid stream, however, it is particularly suitable for the introduction of liquefied chlorine into a aqueous stream.

BACKGROUND OF THE INVENTION

Much of the water in the environment contains bacteria and other microorganisms that may be harmful to plant and animal life, particularly humans. Since many diseases and illnesses are transmitted to humans through drinking water, it has long been the practice to sterilize water intended for human consumption. In general, this has been accomplished by boiling the water or treating the water with a chemical substance which either itself kills the microorganisms or generates other agents which kill the microorganisms. One of the most common chemical methods for destroying harmful bacteria and other microorganisms in an aqueous stream is to treat the aqueous stream with chlorine or a chemical which generates chlorine upon contact with water. For example, water has been chlorinated by the addition of dry substances, such as sodium hypochlorite, to the water. The sodium hypochlorite decomposes upon contact with water to produce chlorine gas. This method of water sterilization is generally unsuitable for large scale treatment of aqueous streams because of the difficulty of continuously metering the dry sodium hypochlorite into the water.

Another commonly practiced method of sterilizing aqueous streams is to introduce gaseous chlorine into the streams. This method is not always satisfactory for large scale plants since it requires large and expensive equipment to handle and deliver the large quantities of chlorine required for adequate sterilization. For example, chlorine, which is generally provided in liquid form in tanks or cylinders, must be vaporized prior to metering into the aqueous stream. This necessitates the use of large size vaporizers which have considerable electricity or steam requirements and which must be frequently cleaned. Another disadvantage of gaseous chlorine water sterilization is that the rapid high volume draw-off of gaseous chlorine may cause freezing of the chlorine lines due to inadequate heat transfer.

An alternative method of chlorinating aqueous streams which has been practiced involves the introduction of liquefied chlorine into the aqueous streams. The use of liquefied chlorine eliminates many of the difficulties encountered when dry powdered chemical substances or gaseous chlorine are used as the sterilizing agents. This technique is also appealing because liquid chlorine is much more concentrated than gaseous chlorine and therefore smaller equipment can be used. For instance, tubing having a diameter of less than one-half inch is adequate for chlorinating water in a large treatment plant using liquefied chlorine, whereas a pipe having a diameter of several inches is required to provide equivalent mole volumes of gaseous chlorine.

However, as might be expected, the use of liquefied chlorine in the treatment of aqueous streams is not completely problem-free. One of the major problems encountered when liquefied chlorine is used to sterilize aqueous streams is that the aqueous stream being treated sometimes freezes in the vicinity of the point of introduction of the liquefied chlorine. This results from the vaporization of the liquefied chlorine as it leaves the chlorine dispensing equipment and enters the water. The vaporization is caused by the low pressure of the water relative to the pressure in the chlorine dispensing system.

Liquefied chlorine generally is transported to treatment facilities in metal tanks and cylinders. After filling, the liquefied chlorine in the closed container boils until its equilibrium vapor pressure is reached. The equilibrium vapor pressure depends on the ambient temperature, and at normal ambient temperatures it is generally in the range of about 80 to 120 psig. The pressure of the aqueous stream being treated, on the other hand, is generally in the range of about 40–60 psig. Thus, as the liquefied chlorine enters the aqueous stream, it undergoes a significant pressure drop, and if its temperature is at or above its boiling point at the pressure of the aqueous stream, it will vaporize into gaseous chlorine. The heat of vaporization of the chlorine is provided by the water, which itself often undergoes a phase change to ice. If this occurs, the ice may surround the liquefied chlorine injection tube and block further passage of chlorine into the water.

Because of the convenience of using liquefied chlorine for sterilizing aqueous streams, continuing efforts are under way to develop methods of introducing liquefied chlorine into aqueous streams without causing the water surrounding the chlorine injection tube to freeze. For instance, U.S. Pat. No. 3,133,877, issued to Mixer et al., describes a process which purportedly eliminates the difficulties encountered in the earlier methods of introducing liquefied gases into liquids. Mixer et al.'s process comprises raising the pressure of the liquefied gas which is to be introduced into a liquid stream to a pressure which is higher than the pressure of both the source of the liquefied gas and the liquid being treated. Mixer et al. accomplishes this by means of a pressure pump and a back pressure valve. Both are situated between the liquefied gas storage container and the injector tube through which the liquefied gas enters the liquid being treated.

A disadvantage of the process disclosed by Mixer et al. is the considerably high pressure required in the system. The pressure of the liquefied chlorine is maintained in the range of 150–200 PSI. High pressure equipment and fittings must be used because at such high pressures there is a danger of leakage of chlorine to the environment. Furthermore, the process disclosed by Mixer et al., while it may prevent the freezing of chlorine in the pressurized equipment located upstream of the back pressure valve, does not solve the problem of ice formation around the injection tube, which is downstream of the back pressure valve, where the chlorine undergoes a pressure drop and may flash.

U.S. Pat. No. 4,770,198 issued to Bergman described another process for introducing a liquefied gas or mixture of liquefied gases into a liquid. Bergman states that his process prevents the liquefied gas from flashing in the liquefied system by maintaining the pressure of the system above the vapor pressure of the liquefied gas until the liquefied gas is injected into the liquid being treated. Bergman accomplishes this by pressurizing the liquefied gas with an inert gas, such as nitrogen, to ensure that there is no pressure drop and consequent freezing in the liquefied gas system, as a result of a sudden draw off of the liquefied gas. Bergman also provides a specially designed back pressure metering valve which permits the liquefied gas to enter the liquid being treated at the point of pressure drop. Freezing of the liquid being treated can still occur in the Bergman device at the point where the liquefied gas is introduced into the main stream of the liquid because of flashing of the liquefied gas.

The currently practiced methods of introducing a liquefied gas into a liquid stream have not successfully overcome the problem of freezing of the liquid stream at the point of liquefied gas injection; thus, there is an ongoing search for a process which effectively accomplishes this result.

OBJECTS OF THE INVENTION

It is an object of the invention to provide an improved system and method for introducing a liquefied gas into a liquid stream.

It is another object of the invention to present a system for introducing a liquefied gas into a liquid stream without causing freezing of the liquid stream in the vicinity of the liquefied gas injection tube.

It is another object of the invention to provide improved apparatus for introducing liquefied chlorine into an aqueous stream.

It is another object of the invention to provide a method of introducing a liquefied gas into a liquid stream which avoids the problem of ice formation around the liquefied gas injection tube.

It is another object of the invention to provide a method of chlorinating an aqueous stream with liquefied chlorine without the occurrence of flashing of the liquefied chlorine in the liquefied chlorine system or in the injection tube through which liquefied chlorine is introduced into the aqueous stream.

These and other objects and advantages of the invention will become apparent from the following detailed description of the invention when considered in conjunction with the attached drawings.

SUMMARY OF THE INVENTION

According to one aspect of the invention, a liquefied gas that is to be injected into a liquid stream whose temperature is above the boiling point of the liquefied gas at the pressure prevailing in the liquid stream, is cooled to a temperature below its boiling point at this pressure before it is injected into the liquid stream. In a preferred embodiment of this aspect of the invention the closed system in which the liquefied gas is stored is padded, i.e. pressurized, with an inert gas to prevent the liquefied gas from flashing to the gaseous state in the closed system. In the most preferred embodiment of the invention the liquefied gas is liquefied chlorine, the liquid stream being treated is an aqueous stream and the padding gas is substantially anhydrous nitrogen or air.

According to another aspect of the invention a closed system for injecting a liquefied gas into a liquid stream is provided with a cooling means adapted to cool the liquefied gas to below its boiling point at the pressure of the aqueous stream. In a preferred embodiment, the cooling means comprises a refrigeration unit.

BRIEF DESCRIPTION OF THE DRAWINGS

The invention is illustrated in the accompanying drawings wherein.

DETAILED DESCRIPTION OF THE INVENTION

The pressure of a closed system, such as a gas cylinder, or a system for use in injecting a liquefied gas into a liquid stream and which is closed off by a metering valve, stabilizes at the vapor pressure of the liquefied gas at the temperature at which the liquefied gas is maintained. When such a contained liquefied gas is injected into a liquid stream that is at a pressure well below the equilibrium vapor pressure of the liquefied gas at the temperature of the liquefied gas, the liquefied gas immediately vaporizes, thereby causing a rapid temperature reduction and often freezing of the treated liquid in the environment surrounding the point of injection. The present invention provides a method and apparatus for introducing a liquefied gas into such a liquid stream without the occurrence of freezing. This is accomplished by cooling the liquefied gas, before injection into the liquid stream, to a temperature below the boiling point of the liquefied gas at the pressure prevailing in the liquid stream. As the cooled liquefied gas enters the liquid stream it heats up, and it may eventually flash when its temperature reaches its boiling point. However, this will not occur until the liquefied gas has moved to a point downstream of the point of injection, where the occurrence of freezing will not adversely affect the liquefied gas metering means. Furthermore, as the liquefied gas enters the liquid stream it is rapidly dispersed in the large body of liquid stream surrounding the liquefied gas, so that very little, if any, freezing occurs.

The invention may be practiced with any stable liquefied gas which is to be metered into a liquid stream. For example, the liquefied gas may be a halogen, oxygen, ammonia or a liquefied hydrocarbon, such as methane or propane. Similarly, the liquid stream may be any stream into which it is desired to meter the liquefied gas and which is subject to freezing or solidification upon rapid cooling. Examples of liquid streams that may be treated by the process of the invention are aqueous streams, such as drinking water and sewage streams and process streams in which it is desired to effect a chemical change, such as bleaching, color reduction and other chemical reactions. The invention is particularly useful for the treatment of aqueous streams, such as the chlorination of drinking water and sewage water, for the purpose of destroying harmful microorganisms. Accordingly, in this description, the invention will be described as it particularly applies to the chlorination of an aqueous stream by liquefied chlorine.

Figure 1:
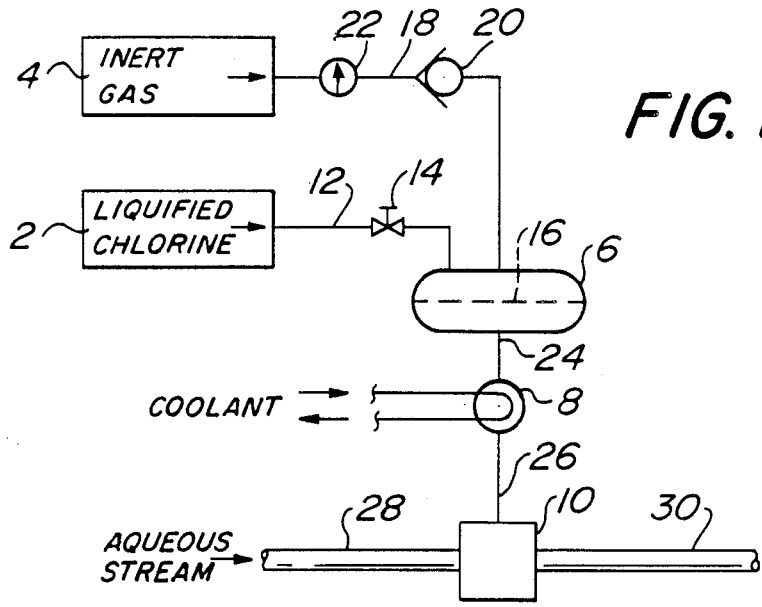
FIG. 1 is a schematic representation of a preferred embodiment of an apparatus for practicing the invention.

The apparatus shown in the embodiment illustrated in FIG. 1 comprises a liquefied chlorine supply container 2, a liquefied inert gas supply container 4, a liquefied chlorine reservoir 6, a heat exchanger 8 and a liquefied chlorine metering unit 10. Container 2 may be any suitable container for liquefied chlorine, such as a standard liquefied gas shipping tank or shipping cylinder. Container 2 is connected to reservoir 6 by means of line 12, which contains a valve 14 that is normally closed during the operation of the liquefied chlorine injection system. When it is desired to recharge reservoir 6 with liquefied chlorine, valve 14 is opened and liquefied chlorine is charged into reservoir 6 until the liquid level reaches the desired height. The liquid level in reservoir 6 is indicated by dotted line 16. The height of the liquid level in reservoir 6 is a matter of choice and the optimum operating liquid level can be determined experimentally.

It is important to maintain a vapor space above the liquefied chlorine in reservoir 6. The vapor space serves the purpose of permitting expansion of the liquefied chlorine as the ambient temperature rises, thereby preventing the possible rupture of reservoir 6 or the lines connecting reservoir 6 with other units of the system. The vapor space in the top of reservoir 6 is preferably great enough to prevent sudden drops of pressure in the system as liquefied chlorine is drawn off. In a preferred embodiment of the invention the system is provided with an inert gas source, designated in FIG. 1 as container 4. The term "inert gas" is used in this description to mean a gas which will not react with the liquefied gas at the existing conditions. It is highly desirable that the inert gas used in the system be substantially anhydrous so that corrosion problems will be minimized. Container 4 is connected to the vapor space in reservoir 6 by means of line 18, which contain a check valve 20 to permit additional inert gas to be added to the system as desired, but which also prevents chlorine gas from backing up into line 18 upstream of valve 20. Line 18 is also provided with a pressure regulator 22 which serves the purpose of maintaining a constant pressure in reservoir 6. The inert gas used in the system of the invention is desirably one which has a vapor pressure higher than that of liquefied chlorine at the ambient conditions, so that a drop in pressure in reservoir 6 as a result of the draw-off of liquefied chlorine will cause additional inert gas to enter the system, in preference to the evaporation of any of the liquefied chlorine in reservoir 6. Typical inert gases usable in the system of the invention include nitrogen, air, argon, helium, etc. The preferred inert gases are nitrogen and compressed air.

The bottom of reservoir 6 is connected to a heat exchanger 8 by means of line 24. The function of heat exchanger 8 is to reduce the temperature of the liquefied chlorine being injected into the aqueous stream to a value below the boiling point of the liquefied chlorine at the pressure of the aqueous stream. Any suitable heat exchange means may be provided for this purpose, including cooling water heat exchangers and refrigeration units. In FIG. 1, heat exchanger 8 is illustrated as being provided with coolant circulating means.

Line 26 connects the outlet side of heat exchanger 8 with liquefied chlorine metering valve 10. In the embodiment illustrated in FIG. 1, the aqueous stream being treated passes directly through metering valve 10. The aqueous stream enters valve 10 through inlet line 28 and exits valve 10 through outlet line 30. Lines 28 and 30 may be connected to metering valve 10 by any suitable fluid-tight means, such as threaded connections.

Metering unit 10 may be of any suitable design. A preferred metering unit design is that described in U.S. Pat. No. 4,770,198, issued to Bergman, the disclosure of which is incorporated herein by reference. Metering unit 10 preferably discharges the liquefied chlorine into the aqueous stream being treated in short intermittent pulses. To accomplish this, unit 10 can be provided with a controller means such as an electric motor (not shown), which causes the metering valve in the unit to open and close as frequently as desired. In a typical liquefied chlorine injection system, the valve is opened and closed as frequently as 70 or more times a minute.

In operating the apparatus of FIG. 1, valve 14 is opened and container 6 is filled to a predetermined level with liquefied chlorine. The system comes to equilibrium by the evaporation of liquefied chlorine in reservoir 6, or, in the preferred embodiment, the system is pressured to the desired pressure by means of inert gas from vessel 4. In the latter case the pressure of the system is set by means of pressure regulator 22. After the flow of aqueous liquid is established through the metering unit, the metering valve is set in operation and the system begins to inject liquefied chlorine into the aqueous stream. As liquefied chlorine passes through heat exchanger 8, it is cooled to the desired temperature, which is below its boiling point at the pressure of the aqueous stream in line 28. The liquefied chlorine thus enters the aqueous stream without flashing. Even if the temperature of the aqueous stream is above the boiling point of chlorine at the pressure of the aqueous stream, the liquefied chlorine will not flash until its temperature is raised to its boiling point, which will not occur until it has moved downstream away from metering unit 10. Thus, when the present invention is practiced, ice will not be formed in the immediate vicinity of metering unit 10.

Figure 2:
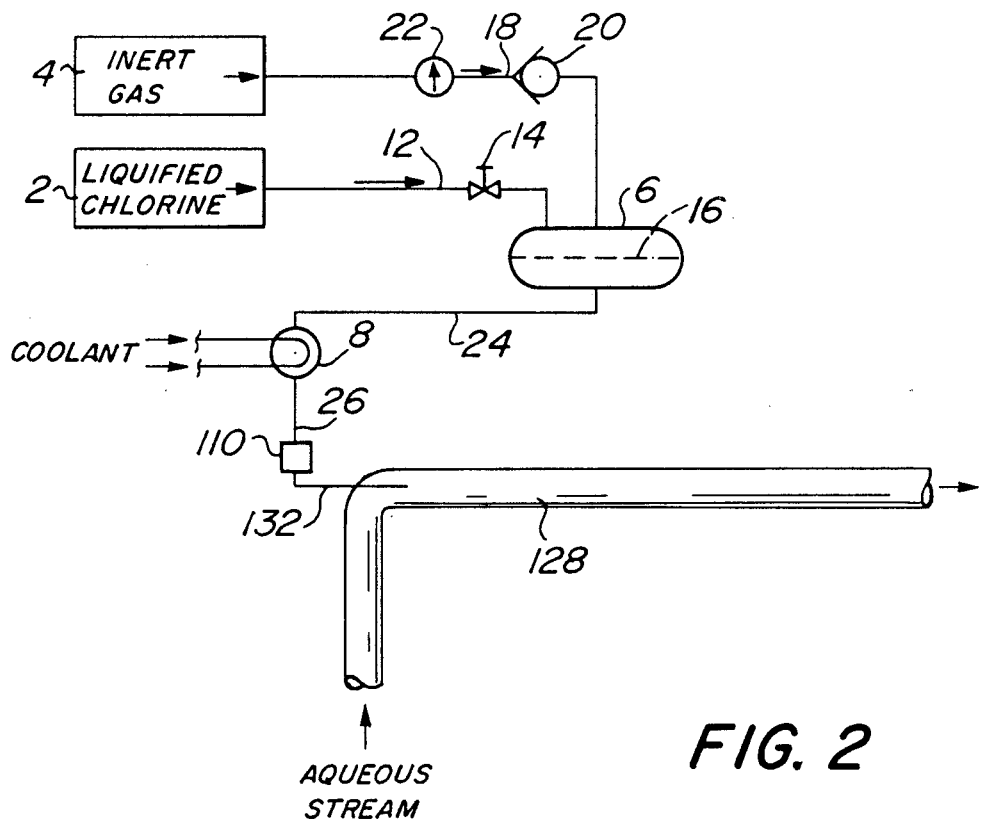
FIG. 2 is a schematic representation of an alternate embodiment of an apparatus for practicing the invention.

FIG. 2 shows an embodiment of the invention having a liquefied chlorine injection means somewhat different from the system illustrated in FIG. 1. The injection means used in this embodiment comprises a metering valve 110, which can be any suitable valve for metering a liquefied gas through a conduit, and an injection tube 132, which is desirably a small diameter tube that is inserted into pipe 128 in such a manner that it does not substantially interfere with the flow of the aqueous stream through pipe 128. The designs of metering valve 110 and injection tube 132 are not a part of the invention, and any suitable metering means and injection means can be used in the apparatus of this embodiment. The liquefied chlorine system of FIG. 2 upstream of metering valve 110 is the same as the liquefied chlorine system of FIG. 1 upstream of metering unit 10.

In the operation of the apparatus of FIG. 2, the cooled liquefied chlorine entering metering valve 110 is injected into the aqueous stream moving in pipe 128. The cooled liquefied chlorine remains in the liquefied state until after it has passed out of tube 132 and into the aqueous stream in pipe 128. Thus, no ice will form in or around tube 132.

As an alternative to the arrangement illustrated in FIGS. 1 and 2, it may be desired to use a liquefied chlorine shipping vessel as reservoir 6. In such an arrangement the shipping vessel, e.g. container 2, would be directly pressured with gas from container 4, line 12 would be connected directly to heat exchanger 8 and valve 14, reservoir 6 and line 26 would be unnecessary. The desired liquid level and vapor space would be maintained in container 2. The rest of the system would remain unchanged.

In some cases it may be desirable to increase the pressure of the aqueous stream being treated. This provides the advantage that the liquefied chlorine would then not have to be cooled to as low a temperature as would otherwise be required to accomplish the purpose of the invention.

It has been observed that when liquefied chlorine is used in injection systems such as those illustrated in the drawings without cooling the liquefied chlorine to a temperature below the boiling point of chlorine at the pressure maintained in the pipe carrying the aqueous liquid, there is a tendency for ice to form at or near the point where the pressure of the liquefied chlorine drops to the pressure of the aqueous stream. For example in the apparatus of FIG. 1, freezing would occur in metering unit 10 and in that of FIG. 2, freezing would occur in or around injection tube 132.

Figure 3:
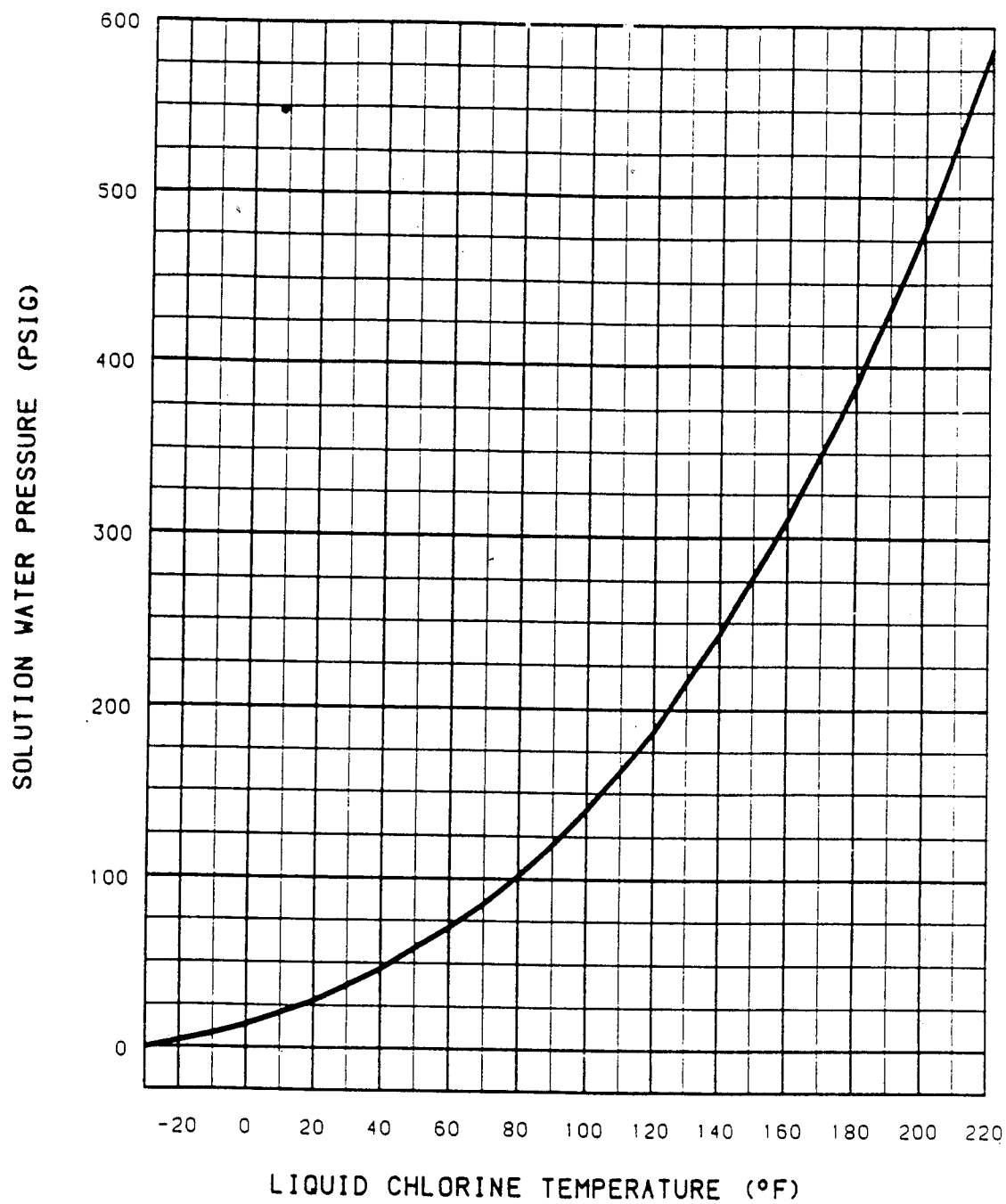
FIG. 3 is a graph of the equilibrium vapor pressure curve for chlorine, showing the variation of the boiling point of chlorine with changing pressures.

The temperature to which the liquefied chlorine is to be cooled can be determined from FIG. 3. The graph shown in FIG. 3 is the vapor pressure curve for chlorine except that the expression "solution water pressure" is substituted for the term "vapor pressure". Chlorine exists as a liquid in the region above and to the left of the curve and as a gas in the region below and to the right of the curve. The temperature below which liquefied chlorine must be cooled to maintain it in the liquid state at a given pressure is determined by locating the pressure in question on the Y axis of the graph, moving horizontally to the curve and reading the temperature vertically below the point of intersection of the ordinate and the curve. For example, to maintain liquefied chlorine in the liquid state at atmospheric pressure (0 psig), it must be cooled to below about $-29.3°$ F.$(-34°$ C.), and to maintain it in the liquid state at a pressure of 55 psig it must be cooled to below about 46° F.(7.8° C.).

The invention is further illustrated in the following example. The liquefied chlorine feeder used in the example was similar to the equipment illustrated in FIG. 1, except that a 32000 pound trailer truck tank was used directly as the liquefied chlorine reservoir. The aqueous stream being treated was the effluent from a sewage treatment plant. During the example run the trailer truck tank was padded to a pressure of about 120 psig with compressed air that had been dried in a Balston regenerative air drier. The liquefied chlorine was chilled by means of a 3000 Btu/hour refrigeration unit.

EXAMPLE I

A continuous 366 hour test run was carried out over a period of several days using the above-described equipment. Over the course of the test run, the temperatures of the liquefied chlorine and the aqueous stream being treated fluctuated as the ambient temperature varied due to climatic changes. During the run the pressure of the aqueous stream being treated varied between about 57 and 65 psig, and its flow rate averaged about 50 to 60 gallons per minute. The padding pressure was maintained in the range of about 102 to 123 psig and the temperature of the liquefied chlorine entering the chilling unit varied between about 79 and 89 degrees F. (between about 26 and 32 degrees C.) and it was cooled in the chilling unit to a temperature in the range of about 47 to 57 degrees F. (8 to 14 degrees C.). The average feed rate of liquefied chlorine over the course of the test run was about 2100 to 2270 pounds per day. No ice build up or blockage of the conduits carrying the liquefied chlorine and aqueous stream occurred during the test run.

Although the invention is described with particular reference to a specific example, variations contemplated. For example, the process of the invention can be practiced using liquefied gases other than liquefied chlorine and liquid streams other than water-based streams can be treated. Similarly, the process of the invention can be used to chlorinate still bodies of water, such as ponds and reservoirs. The scope of the invention is limited only by the breadth of the appended claims.

What is claimed:

1. Apparatus for mixing a liquefied gas with
a liquid stream which comprises:
a reservoir for the liquefied gas,
heat exchange means for cooling said liquefied gas to a temperature below the boiling point of the liquefied gas at the temperature of said liquid stream,
a normally closed liquefied gas metering valve,
liquid stream conduit means,
means for conducting the liquefied gas from said reservoir to said heat exchange means,
means for conducting the cooled liquefied gas from said heat exchange means to said metering valve,
means for conducting the cooled liquefied gas from said metering valve into said conduit means, and
means for opening said valve to permit a predetermined amount of said liquefied gas to pass into said conduit means.

2. The apparatus of claim 1 additionally comprising means for introducing an inert gas into said reservoir.

3. The apparatus of either of claims 1 or 2 wherein said heat exchange means is a refrigeration unit.

4. The apparatus of claim 3 additionally comprising means for increasing the pressure of said liquid stream.

5. The apparatus of either of claims 1 or 2 wherein said metering valve comprises a mixing chamber for said liquefied gas and said liquid stream.

6. The apparatus of either of claims 1 or 2 wherein said means for introducing said liquefied gas into said conduit means comprises tubing.

7. Apparatus for mixing a liquefied gas having a vapor pressure substantially in excess of atmospheric pressure with a liquid in measured amounts which comprises: a container for holding said liquefied gas, means for maintaining a gaseous atmosphere in the container at a pressure substantially in excess of the vapor pressure of the liquefied gas, heat exchange means for cooling said liquefied gas to a temperature below the boiling point of the liquefied gas at the temperature of said liquid, a metering valve having a passageway therethrough for said liquid, means for conducting the liquefied gas from said container to said heat exchange means, means for conducting said liquefied gas from said heat exchange means to said metering valve, and means for intermittently opening said metering valve to permit predetermined amounts of said liquefied gas to be injected into said passageway.

8. A method for introducing a liquefied gas having a vapor pressure substantially in excess of atmospheric pressure into a liquid stream whose temperature is higher than the boiling point of said liquefied gas at the pressure of the liquid stream comprising cooling said liquefied gas to a temperature below the boiling point of said liquefied gas at the pressure of said liquid stream and injecting said cooled liquefied gas into said liquid stream.

9. A method for introducing liquefied chlorine into an aqueous stream comprising cooling said liquefied chlorine to a temperature below its boiling point at the pressure of the aqueous stream and injecting said liquefied chlorine into said aqueous stream.

10. A method for introducing a liquefied gas having a vapor pressure substantially in excess of atmospheric pressure into a liquid stream whose temperature is above the boiling point of said liquid gas at the pressure of said liquid stream which comprises maintaining said liquefied gas under pressure substantially in excess of its vapor pressure, cooling said liquefied gas to a temperature below its boiling point at the pressure of said liquid stream and injecting said cooled liquefied gas into said liquid stream.

11. A method for introducing liquefied chlorine into an aqueous stream whose temperature is higher than the boiling point of liquefied chlorine at the pressure of said aqueous stream comprising cooling said liquefied chlorine to a temperature below its boiling point at the pressure of said aqueous stream and injecting said cooled liquefied chlorine into said aqueous stream.

12. The method of claim 11 wherein said liquefied chlorine is maintained under pressure substantially in excess of its vapor pressure.

13. The method of either of claims 10 or 12 wherein said liquefied chlorine is maintained under a pressure greater than its vapor pressure by means of an inert gas prior to injecting said liquefied chlorine into said aqueous stream.

14. The method of claim 13 wherein said inert gas is selected from nitrogen and air.

15. The method of claim 13 wherein said inert gas is substantially anhydrous.

16. A method for treating a aqueous stream with liquefied chlorine comprising cooling said liquefied chlorine to a temperature below its boiling point at the pressure of the aqueous stream, conducting said cooled liquefied chlorine to a release location in said aqueous stream and periodically releasing said cooled liquefied chlorine into said aqueous stream.

17. The method of claim 16 wherein the pressure of said aqueous stream is raised to a level higher than its normal flowing pressure in said pipe.

18. The method of claim 16 wherein said liquefied chlorine is maintained at a pressure greater than its vapor pressure prior to releasing said liquefied chlorine into said aqueous stream.

19. The method of claim 18 wherein said liquefied chlorine is maintained at said pressure greater than its vapor pressure by padding it with an inert gas.

20. The method of claim 19 wherein said inert gas is selected from nitrogen and air.

21. The method of claim 19 wherein said inert gas is substantially anhydrous.

* * * * *